United States Patent [19]

Grandin, Jr. et al.

[11] 4,182,372
[45] Jan. 8, 1980

[54] MIXING VALVE

[75] Inventors: Hartley F. Grandin, Jr., Northboro; Donald R. Nelson, Worcester, both of Mass.

[73] Assignee: Goddard Industries, Inc., Worcester, Mass.

[21] Appl. No.: 913,951

[22] Filed: Jun. 9, 1978

Related U.S. Application Data

[63] Continuation of Ser. No. 741,192, Nov. 12, 1976, abandoned.

[51] Int. Cl.² .......................... F16K 7/12; F16K 11/00
[52] U.S. Cl. .................................. 137/625.4; 137/607; 251/331
[58] Field of Search ............... 137/625.41, 625.4, 607; 251/331, DIG. 2

[56] References Cited
U.S. PATENT DOCUMENTS

| | | | |
|---|---|---|---|
| 2,675,025 | 4/1954 | Wynkoop | 251/DIG. 2 |
| 3,339,583 | 9/1967 | Fleckenstein et al. | 251/331 X |
| 3,422,849 | 1/1969 | Manoogian | 137/625.41 |
| 3,809,124 | 5/1974 | Nelson | 137/625.41 |

*Primary Examiner*—Arnold Rosenthal
*Attorney, Agent, or Firm*—Wolf, Greenfield & Sacks

[57] ABSTRACT

The valve is of the type that includes a single operating handle for controlling both the proportioning between hot and cold water flow and also the volume of flow. The valve comprises a body having hot and cold inlet passages and an outlet duct, a ball-shaped control member, a rigid stationary liner receiving the control member and having position limiting tabs associated therewith, and a resilient diaphragm disposed intermediate the liner and valve seat of the body. The liner has a pair of apertures for accommodating a corresponding pair of nipples on the diaphragm which are displaceable toward and away from the inlet passages for controlling the flow of fluid therefrom. The opening of the inlet passages into the seat is constructed to provide a uniform load about the passages for the diagram in the seat.

17 Claims, 8 Drawing Figures

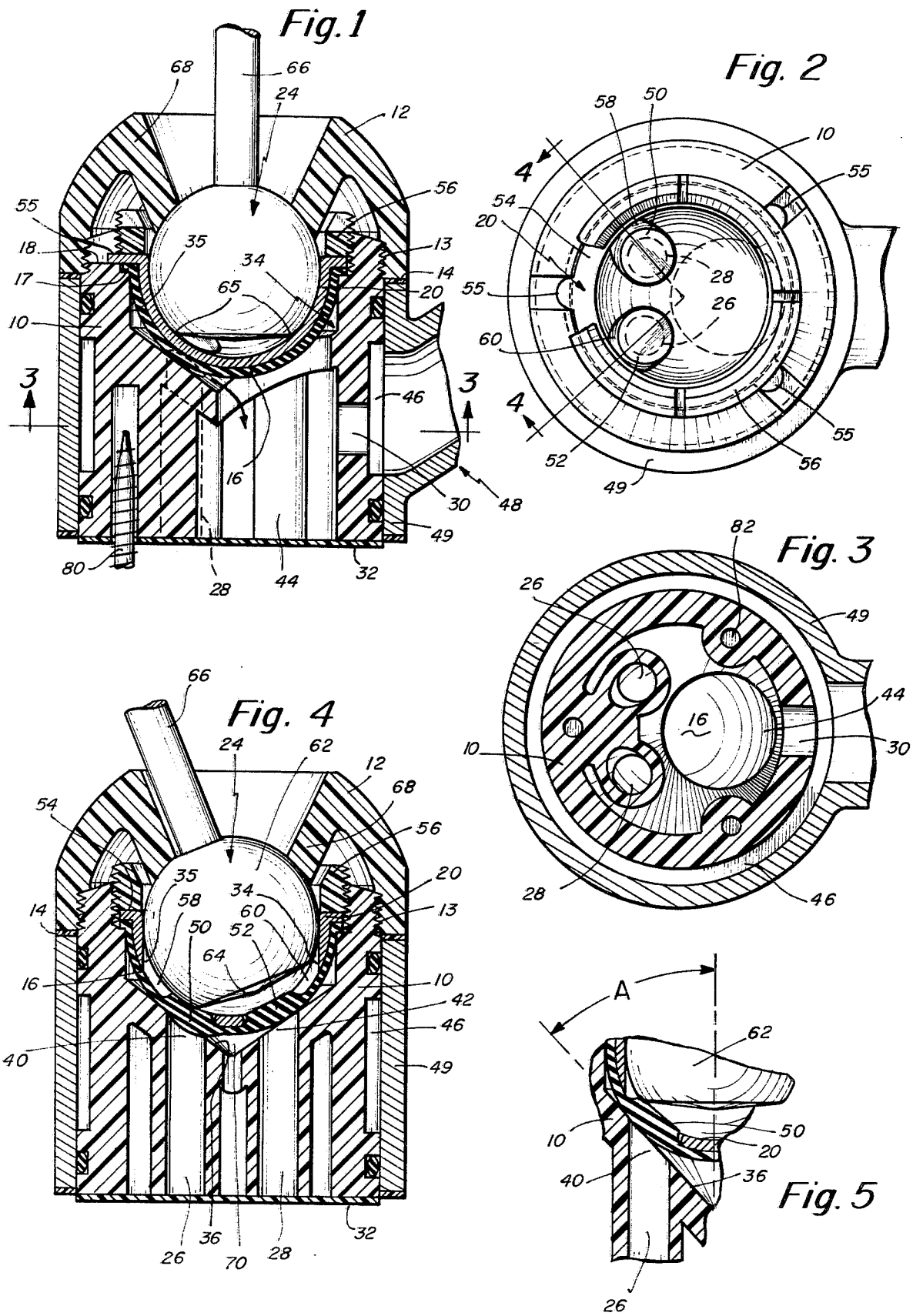

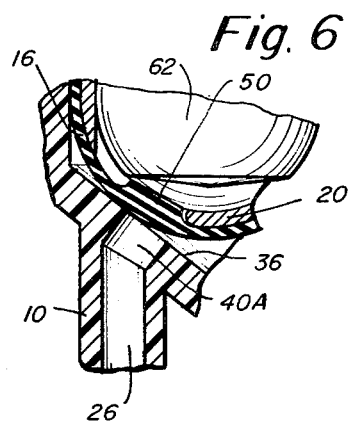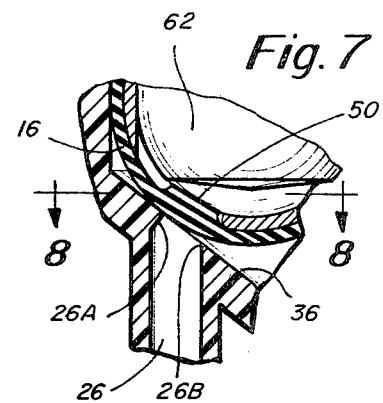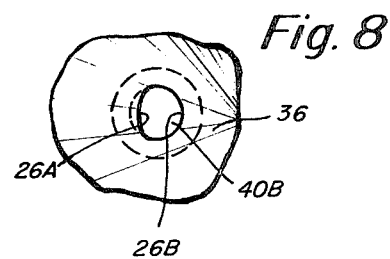

MIXING VALVE

This is a continuation of application Ser. No. 741,192, filed Nov. 12, 1976 and now abandoned.

BACKGROUND OF THE INVENTION

The present invention relates in general to a mixing or proportioning valve and refers more particularly to a ball-type single handle valve for mixing hot and cold water and for controlling the volume of flow through the valve.

U.S. Pat. No. 3,809,124 discloses a single handle mixing valve that comprises a body, ball-shaped control member, a liner and diaphragm. One object of this invention is to provide an improved mixing valve which is characterized by a long operating life.

One problem with the existing valve structure is that the flow through the valve is somewhat restricted. This occurred primarily because it was possible to tighten the liner too tightly against the diaphragm. Accordingly, one object of the present invention is to provide for improved flow through the valve by limiting the position of the liner and diaphragm to the body.

Another problem that was encountered with the prior art structure was wear of the diaphragm especially about the nipples of the diaphragm.

Accordingly, another object of the present invention is to provide an improved mixing valve structure that will reduce wear of the diaphragm.

A further object of the present invention is to provide an improved construction for the ball-shaped control member.

Still another object of the present invention is to provide an improved porting arrangement for the inlet ports that will enhance the sealing characteristics of the valve.

Another object of the present invention is to provide an improved mixing or proportioning valve that has good sealing characteristics, that can be manufactured preferably using mostly plastic parts and at a reasonable cost, that is easy to maintain that has an easily replaceable diaphragm, and that has a long cycle life.

SUMMARY OF THE INVENTION

To accomplish the foregoing and other objects of this invention there is provided a mixing valve that comprises a body having a conical valve seat, a flexible diaphragm fitted in the seat, a relatively rigid and particlly spherical liner fitted in the diaphragm and a spherical closure member fitting within the liner. The body has preferably two inlet passages for accommodating hot and cold water and an outlet duct disposed therein with the inlet passages terminated in two spaced inlet ports in the conical seat. The inlet ports are specially terminated to enhance the sealing of the diaphragm to the seat which is believed to also reduce wear on the diaphragm especially about the nipples. The diaphragm is sealed to the body at its periphery and is of a relatively uniform thickness having a pair of protruding nipples overlying the inlet ports of the body. The spherical liner fits within the diaphragm, is preferably constructed of metal and is sealed to the diaphragm at its periphery. The liner is provided with positioning tabs or the like which limit the clamping action of the liner against the diaphragm in which the liner seats. The liner is provided with a pair of apertures extending therethrough overlying the nipples of the diaphragm with each nipple extending through its corresponding aperture. The closure member normally holds the nipples of the diaphragm against the conical seat to cover and seal the inlet ports and prevent fluid flow through the valve. The closure member has a relieved valving surface that is preferably not flat but of a slight conical taper. The relieved surface is provided so that upon movement of the closure member to an open position fluid from at least one of the inlet ports flexes its associated nipple away from the seat and against the valving surface to thereby open the associated inlet port. The closure member preferably has a single handle extending therefrom for moving the closure member between opened and closed positions and for also moving the closure member to control the mixture of fluids from the two inlet ports.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a cross-sectional view taken through one embodiment of the mixing valve of this invention;

FIG. 2 is a top view of the valve shown in FIG. 1 with the cap and closure member removed;

FIG. 3 is a cross-sectional view taken along line 3—3 of FIG. 1;

FIG. 4 is a cross-sectional view taken along line 4—4 of FIG. 2;

FIG. 5 is a fragmentary view showing one modification in accordance with this invention;

FIG. 6 is a fragmentary cross-sectional view of another modification in accordance with this invention in the inlet porting area of the valve body;

FIG. 7 is a fragmentary cross sectional view of still another modification in accordance with the invention; and FIG. 8 is a cross sectional view taken along line 8—8 of FIG. 7.

DETAILED DESCRIPTION

Referring now to the drawings and in particular to FIGS. 1–4 there is shown one embodiment of the mixing valve structure of the present invention incorporating some of the improvements of this invention. FIGS. 5–8 show in greater detail further modifications in the form of different embodiments for the inlet porting. In FIGS. 1–4 the mixing valve generally comprises a body 10, a cap 12, diaphragm 16, metallic liner 20, and a spherical closure member 24. The body 10, cap 12 and the spherical closure member 24 may be constructed of plastic. The diaphragm 16 is preferably made of a flexible synthetic rubber or plastic material.

The body 10 is of generally cylindrical shape and has inlet passages 26 and 28, and an outlet duct 30 extending therethrough. Gasket 32 may close the bottom of the body 10 as shown in FIGS. 1 and 4.

The body 10 also has defined therein a valve seat 34 defined by a vertical surface 35 and a slanted surface 36 which defines a substantial conical valve seat. The inlet passages 26 and 28 extend to the conical seat and define respective inlet ports 40 and 42. The specific construction of the passages 26 and 28 and their associated prots 40 and 42 is discussed in more detail hereinafter with reference to FIGS. 5–8.

As depicted in FIG. 1, the outlet duct 30 couples to an annular channel 46 in the outer periphery of the body 10. A faucet member 48 which may include a typical discharge spout, also includes annular member 49 which, together with body 10 define the channel 46. When the faucet is open the water passes from the valve seat through the main duct 44 and the fluid is ported to the outlet duct 30 and channel 46 to the spout of the faucet member 48. The faucet member 48 is usually permitted rotational movement relative to the body 10.

The semi-spherical diaphragm 16 fits within seat 34 and has a peripheral flange 17 that rests upon a relieved edge channel of shoulder 18 of the body. FIG. 1 shows the shoulder with its channel or step for receiving flange 17 so that the liner 20 is limited in squeezing against the flange 17 as discussed in more detail hereinafter. The diaphragm 16 is of substantially the same thickness throughout with the exception of nipples 50 and 52 which are deflectable by means of the closure member 24 to cover and uncover their associated ports 40 and 41, respectively.

The liner 20 may be constructed of a metal material such as brass and is also of semi-spherical shape. The liner 20 includes a top flange 54 that covers the flange 17 of the diaphragm, and has three position limiting tabs 55 which are integral with the flange 54 and each of which rests upon the step shoulder 18 as clearly shown in FIG. 1. There is solid contact between each of the tabs 55 and the shoulder 18 and this limits the squeezing by the flange 54 against the flange 17 on the diaphragm. If the tabs 55 are disposed at uneven spacings as indicated in FIG. 2, so that the liner and associated diaphragm can be positioned in the body in only one position. In order to maintain both the liner and the diaphragm in their proper seated position a compression ring 56 is provided which threadedly mates with the body 10 and compresses the liner against the diaphragm with the amount of compression again limited by virtue of the tabs 55 contacting the shoulder 18. The liner 20 has two openings or apertures 58 and 60 which respectively receive nipples 50 and 52. The apertures 58 and 60 are slightly larger than the nipples 50 and 52. The configuration of the apertures 58 and 60 is shown most clearly in FIG. 2. The closure member 24 comprises ball 62 which is spherical in shape except for the relief provided by surface 64 which is preferably not a flat surface but which is slightly tapered as shown in FIGS. 1 and 4. Actually surface 64 has a very slight conical shape and is provided with an annular radius 65, which is helpful in reducing the wear of the diaphragm especially at the nipples 50 and 52. Handle 66 is suitably secured to the ball 62 for controlling the movement thereof. The operation of the closure member in association with the liner and diaphragm is discussed in more detail hereinafter.

The mixing valve of this invention is also provided with a cap 12 which is suitably threaded at 13 to the top end of the body 10. A gasket 14 may be provided between the bottom end of cap 12 and the top surface of annular member 49. The cap 12 has a downwardly depending converging wall 68 which, when the cap 12 is threaded in place, has its end urged against ball 62. The annular wall 68 is provided for limiting the movement of handle 66.

The mixing valve shown in FIGS. 1-4 may be connected to a base by means of three threaded bolts 80, one of which is shown partially in FIG. 1. These bolts thread into three receiving apertures 82 shown in FIG. 3.

In order to open one or both of the ports 40 and 4? the ball 62 is rotated such as to the position shown in FIG. 4. In this position the valving surface 64 permits one of the nipples 52 to at least partially deflect away from its associated port 42. With the handle 66 in an upright position such as shown in FIG. 1 then both of the nipples 50 and 52 may be deflected away from their associated ports. It can be seen in FIG. 4 that water passing through the inlet 28 also passes into the space 70 defined between the seat 36 and the diaphragm 16 and from there passes by way of ducts 44 and 30 to the faucet assembly 48. If the handle 66 is in a vertical position then substantially equal amounts of hot and cold water are expelled through ports 40 and 42 into the mixing area 70 which is formed by virtue of the conical seat in association with the spherical diaphragm. It is noted that the outlet duct 44 is of substantially larger size than the inlet passages 26 and 28.

The volume control is provided by moving the handle 66 from left to right as viewed in FIG. 2. In one position the ball is seated against the nipples 50 and 52 and urges the nipples against the ports sealing the passages 26 and 28. In the other position the surface 64 overlies the nipples and the nipples are permitted to deflect against surface 64 permitting water to pass at least from one of the inlet ports 26 and 28 to the outlet.

In the past the diaphragm 16 has tended to wear especially about the nipples 50 and 52 where they contact about the ports 40 and 42 especially at the lower edge of contact. This was caused by non-uniform sealing about the nipples. The improved porting arrangements shown in FIGS. 5-8 and discussed hereinafter are usable to improve sealing. In addition, wear can be reduced with the special construction closure member shown in FIGS. 1 and 4. The radius 65 tends to reduce wear of the diaphragm and the more gradual surface 64 also tends to reduce wear and pull on the inside surfaces of the diaphragm.

FIG. 5 is a fragmentary view indicating one modfication that may be useful in reducing diaphragm wear especially about the nipples. The construction shown in FIG. 5 is substantially the same as that shown in FIG. 4 except that the conical seat 36 is constructed at a different angle. In FIGS. 1 and 4 this angle is typically 45° whereas the angle A shown in FIG. 5 is typically on the order of 30°. Actually, the preferred range for the angle A is between 25°-35°.

FIG. 6 shows still a further modification for reducing wear of the diaphragm by terminating the inlet passage 26 in a port 40A that is directed orthogonally to the tapered surface 36. The modification in accordance with FIG. 6 tends to equalize the pressure about the nipple 50. Of course, a similar porting arrangement 42A would be provided for the other inlet port 28 which is not shown in FIG. 6.

FIGS. 7 and 8 show still a further modification which is a preferred modification for increasing sealing ability. In this arrangement the inlet passage 26 is substantially the same as shown in FIGS. 1 and 4 with the exception of a chamfer surface 26A terminating in a port 40B as shown in FIG. 8 that is somewhat egg-shaped. The surface 26A is preferably orthogonal to the tapered surface 36.

To summarize some of the features of the present invention, the liner is provided with means for limiting its position relative to the body so as not to squeeze the diaphragm too tightly in the valve seat. Illustratively, these limiting means comprise tabs 55 and the stepped portion of shoulder 18. The ball has been constructed with not a flat surface but rather a conical surface. It is preferred that the closure member also have radiuses so that there are no even partially sharp corners that contact the diaphragm. Further, the taper on the surface 64 provides for a more gradual contact with the nipples 50 and 52 which is advantageous from the standpoint of reducing wear and pull on the diaphragm. Finally, the inlet porting arrangement has been improved to increase sealing ability and thus reduce wear of the diaphragm. Previously, the lower edge of each nipple where it contacted the edge of the port tended to not contact adequately. There have been shown herein different modifications for increasing sealing. A preferred modification as shown in FIG. 7 including a chamfer surface 26A which causes a more even distribution of the pressure between the diaphragm and the seat.

What is claimed is:

1. A mixing valve comprising;
    a body having two inlet passages, an outlet duct and a valve cavity including a valve seat disposed therein with the inlet passages terminating in two spaced inlet ports in the seat,
    a flexible diaphragm fitted in said seat,
    said diaphragm having a pair of protruding nipples overlying said inlet ports,
    a liner fitted in said diaphragm,
    said liner having a pair of apertures therethrough overlying said nipples with each said nipple extending through said aperture,
    a closure member fitted within said liner so as to normally hold the nipples of said diaphragm against said seat to cover and seal said inlet ports and prevent fluid flow through said valve,
    said closure member having a diaphragm back-up surface so that upon movement of said closure member to an open position thereof fluid from at least one of said inlet ports flexes at least one of the nipples of said diaphragm away from said seat and toward said diaphragm back-up surface to open such inlet port,
    and means for moving said closure member between open and closed positions and for moving said closure member to control the mixture of the fluids from the two inlet ports,
    said diaphragm having a peripheral edge having top and bottom surfaces adapted to be sandwiched between said liner and body,
    said liner having edge means contacting a surface of the body for limiting compression of the diaphragm to prevent excessive compression of the diagram by the liner by limiting the spacing between said liner and said contacted surface of the body thus limiting the compressed dimension between said top and bottom surfaces of the peripheral edge of said diaphragm.

2. A mixing valve as set forth in claim 1 wherein said edge means includes at least one peripheral flange or tab contacting a shoulder of the body.

3. A mixing valve as set forth in claim 2 wherein said edge means comprises three tabs extending from a peripheral flange.

4. A mixing valve as set forth in claim 3 wherein the tabs are not all equally spaced about the periphery of the liner.

5. A mixing valve as set forth in claim 4 wherein said body has three notches for receiving the three tabs of the liner.

6. A mixing valve as set forth in claim 1 wherein said valving surface has a conical shape and a radius is provided between the valving surface and remainder of the closure member.

7. A mixing valve as set forth in claim 1 wherein said inlet ports are defined by at least a wall segment extending substantially orthogonally to the valve seat surface.

8. A mixing valve comprising:
    a body having two inlet passages, an outlet duct and a valve cavity including a conical valve seat disposed therein with the inlet passages terminating in two spaced inlet ports in the seat,
    a flexible diaphragm fitted in said seat,
    said diaphragm having a pair of protruding nipples overlying said inlet ports and prevent fluid flow through said valve,
    a liner fitted in said diaphragm,
    said liner having a pair of apertures therethrough overlying said nipples with each said nipple extending through said aperture,
    a ball-shaped closure member fitted within said liner so as to normally hold the nipples of said diaphragm against said seat to cover and seal said inlet ports and prevent fluid flow through said valve,
    said closure member having a diaphram back-up surface so that upon movement of said closure member to an open position thereof fluid from at least one of said inlet ports flexes at least one of the nipples of said diaphragm away from said seat and toward said diaphragm back-up surface to open such inlet port,
    and means for moving said closure member between open and closed positions and for moving said closure member to control the mixture of the fluids from the two inlet ports,
    said inlet passages each including a lower walled section extending in a direction at an acute angle to the conical seat, and an upper walled section at least in part defining the inlet ports, said upper walled section extending substantially orthogonally to the conical valve seat surface and said upper and lower walled sections being contiguous.

9. A mixing valve comprising;
    a body having two inlet passages, an outlet duct and a valve cavity including a valve seat disposed therein with the inlet passages terminating in two spaced inlet ports in the seat,
    a flexible diaphragm fitted in said seat,
    said diaphragm having a pair of protruding nipples overlying said inlet ports,
    a liner fitted in said diaphragm,
    said liner having a pair of apertures therethrough overlying said nipples with each said nipple extending through said aperture,
    a closure member fitted within said liner so as to normally hold the nipples of said diaphragm against said seat to cover and seal said inlet ports and prevent fluid flow through said valve,
    said closure member having a diaphragm back-up surface so that upon movement of said closure member to an open position thereof fluid from at least one of said inlet ports flexes at least one of the nipples of said diaphragm away from said seat and toward said diaphragm back-up surface to open such inlet port, and means for moving said closure member between open and closed positions and for moving said closure member to control the mixture of the fluids from the two inlet ports, said liner having edge means contacting a surface of the body for limiting the position of the liner relative to the diaphragm to prevent excessive compression of the diaphragm by the liner, said body having an upwardly facing substantially flat surface of the body, said edge means contacting said flat surface of the body.

10. A mixing valve as set forth in claim 1 wherein said edge means extends beyond said diaphragm perimeter to contact said body.

11. A mixing valve comprising;

a body having two inlet passages, an outlet duct and a valve cavity including a valve seat disposed therein with the inlet passages terminating in two spaced inlet ports in the seat, a flexible diaphragm fitted in said seat, said diaphragm having a pair of protruding nipples overlying said inlet ports, a liner fitted in said diaphragm, said liner having a pair of apertures therethrough overlying said nipples with each said nipple extending through said aperture, a closure member fitted within said liner so as to normally hold the nipples of said diaphragm against said seat to cover and seal said inlet ports and prevent fluid flow through said valve, said closure member having a diaphragm back-up surface so that upon movement of said closure member to an open position thereof fluid from at least one of said inlet ports flexes at least one of the nipples of said diaphragm away from said seat and toward said diaphragm back-up surface to open such inlet port, and means for moving said closure member between open and closed positions and for moving said closure member to control the mixture of the fluids from the two inlet ports, said liner having edge means contacting a surface of the body for limiting the position of the liner relative to the diaphragm to prevent excessive compression of the diaphragm by the liner, said edge means comprising a plurality of tabs extending from a peripheral flange, said body having a plurality of notches corresponding in number to said tabs for receiving the tabs of the liner.

12. A mixing valve as set forth in claim 8 wherein the inlet passage defining the port has a major wall segment disposed angularly to the valve seat surface and the chamfered wall segment.

13. A mixing valve as set forth in claim 12 wherein the inlet port as viewed from the seat longitudinally of the associated inlet passage has an elliptical port section and a circular port section.

14. A mixing valve as set forth in claim 8 wherein the length of the upper walled section is less than the length of the lower walled section.

15. A mixing valve as set forth in claim 8 wherein the lower walled section includes a circular cross-section passage and said upper walled section includes only a circumferential segment forming a chamfered surface at the port.

16. A mixing valve as set forth in claim 14 wherein the lower walled section includes a circular cross-section passage extending along only one segment to the port.

17. A mixing valve as set forth in claim 8 wherein the upper walled sections of each passage extend in different directions.

* * * * *